US012698426B2

(12) United States Patent (10) Patent No.: US 12,698,426 B2

Yamasaki et al. (45) Date of Patent: Aug. 4, 2026

(54) ADHESIVE RESIN COMPOSITION AND FILM

(71) Applicant: MITSUI CHEMICALS, INC., Tokyo (JP)

(72) Inventors: Takashi Yamasaki, Chiba (JP); Yoshiyuki Ogawa, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 97 days.

(21) Appl. No.: 18/683,282

(22) PCT Filed: Aug. 17, 2022

(86) PCT No.: PCT/JP2022/031050

§ 371 (c)(1),
(2) Date: Feb. 13, 2024

(87) PCT Pub. No.: WO2023/022168

PCT Pub. Date: Feb. 23, 2023

(65) Prior Publication Data

US 2024/0343950 A1 Oct. 17, 2024

(30) Foreign Application Priority Data

Aug. 18, 2021 (JP) ................................. 2021-133538

(51) Int. Cl.
| | |
|---|---|
| *C09J 123/12* | (2006.01) |
| *C09J 123/08* | (2006.01) |
| *H01M 10/0525* | (2010.01) |
| *H01M 50/193* | (2021.01) |

(52) U.S. Cl.
CPC ........... *C09J 123/12* (2013.01); *C09J 123/08* (2013.01); *H01M 10/0525* (2013.01); *H01M 50/193* (2021.01)

(58) Field of Classification Search
CPC . C09J 123/12; C09J 123/08; C09J 7/10; C09J 2203/33; C09J 2423/10; C09J 123/14; C09J 7/35; H01M 10/0525; H01M 50/193; H01M 50/119; H01M 50/121; H01M 50/124; B32B 2457/10; B32B 2553/00; B32B 7/12; B32B 15/085; B32B 15/20; B32B 27/08; B32B 27/32; C08L 2205/035; C08L 23/14; C08L 51/06; C08L 23/08; C08L 23/04
See application file for complete search history.

(56) References Cited

U.S. PATENT DOCUMENTS

| | | |
|---|---|---|
| 9,447,267 B2 | 9/2016 | Matsumoto et al. |
| 11,685,843 B2 | 6/2023 | Maeda et al. |
| 2013/0273386 A1 | 10/2013 | Matsumoto et al. |
| 2020/0002577 A1 | 1/2020 | Maeda et al. |
| 2021/0002465 A1 | 1/2021 | Iwashita et al. |

FOREIGN PATENT DOCUMENTS

| | | |
|---|---|---|
| JP | 2007-273398 A | 10/2007 |
| JP | 2020-093428 A | 6/2020 |
| JP | 2020-111745 A | 7/2020 |
| WO | WO-2012/077706 A1 | 6/2012 |
| WO | WO-2018/180165 A1 | 10/2018 |
| WO | WO-2019/176403 A1 | 9/2019 |

OTHER PUBLICATIONS

WO2019176403(A1) Machine Translation of Description (Year: 2025).*

* cited by examiner

*Primary Examiner* — Cynthia L Schaller

(74) *Attorney, Agent, or Firm* — Foley & Lardner LLP

(57) ABSTRACT

An adhesive resin composition, including 50 to 89.9 parts by mass of a propylene-based polymer (A) satisfying the following (a1) and (a2), 0.1 to 20 parts by mass of a modified polyolefin (B), and 10 to 30 parts by mass of an ethylenic polymer (C) satisfying the following (c1) to (c3) (the sum of (A), (B) and (C) is 100 parts by mass).

(a1) The propylene polymer (A) includes a propylene-based polymer (a-1) with the melting point $\geq 120°$ C. and a propylene-based polymer (a-2) with the melting point $<120°$ C.

(a2) The proportion of the (a-1) in the (A) is 50 to 70.0% by mass.

(c1) The ethylenic polymer (C) includes an ethylene homopolymer (c-1) and an ethylene •α-olefin copolymer (c-2).

(c2) MFR=0.1 to 10 g/10 minutes.

(c3) The proportion of the copolymer (c-1) in the (C) is 40 to 100% by mass.

10 Claims, No Drawings

ADHESIVE RESIN COMPOSITION AND FILM

TECHNICAL FIELD

The present invention relates to an adhesive resin composition and a film using the same.

BACKGROUND ART

In recent years, the field of lithium ion batteries for use has expanded to involve portable electronic devices and automobiles, for example. For packaging materials of lithium ion batteries, laminated packaging materials in which a composite of a light-weight aluminum foil and a resin film stacked thereon is formed in bag shape have been used instead of conventional metal cans, in view of degree of freedom in battery shape and dealing with miniaturization of the batteries.

Moreover, in lithium ion batteries, edges of metal foils are heat-sealed together by an adhesive polyolefin film to adhere them together and ensure their insulation.

Patent Literature 1 describes a packaging material for batteries in which a substrate layer, a metal foil layer on at least one side of which a chemical conversion treatment layer is provided, an acid modified polyolefin layer, a heat sealing layer including a high melting point polypropylene layer and an ethylene propylene random copolymer layer, are at least sequentially stacked, wherein the high melting point polypropylene layer is arranged on a side of the metal foil layer closer than the ethylene propylene random copolymer layer is, and has a melting point of 150° C. or higher.

CITATION LIST

Patent Literature

[Patent Literature 1] JP2007-273398A

SUMMARY OF INVENTION

Technical Problem

Packaging films for lithium ion batteries have a problem of decreased adhesive strength between an adhesive polyolefin film and a metal foil upon immersion in an electrolytic solution, and it is necessary that this adhesive strength does not decrease (hereinafter referred to as "resistance to electrolytic solution"); however, the packaging film for batteries described in Patent Literature 1 has an insufficient resistance to electrolytic solution.

In lithium ion batteries, there is also an adhesive polyolefin film called an electrode sealing material, which adheres electrodes together, and this adhesive polyolefin film is also required for having a resistance to electrolytic solution.

An object of the present invention is to provide an adhesive resin composition capable of forming a packaging film for batteries with an excellent resistance to electrolytic solution and an electrode sealing material for lithium ion batteries, as well as a monolayer or multilayer film that exhibits an excellent resistance to electrolytic solution when used in the packaging film for batteries and the electrode sealing material for lithium ion batteries.

Solution to Problem

The present invention relates to the following [1] to [11], for example.

[1]

An adhesive resin composition, including 50 to 89.9 parts by mass of a propylene-based polymer (A) satisfying the following (a1) and (a2), 0.1 to 20 parts by mass of a modified polyolefin (B) obtained by modifying a polyolefin (b) with an unsaturated carboxylic acid and/or a derivative thereof, and 10 to 30 parts by mass of an ethylenic polymer (C) satisfying the following (c1) to (c3) (provided that the sum of (A), (B) and (C) is 100 parts by mass).

(a1) The propylene polymer (A) includes a propylene-based polymer (a-1) having the melting point (Tm) of 120° C. or higher observed in differential scanning calorimetry, and a propylene-based polymer (a-2) having the melting point (Tm) of lower than 120° C. observed or having no melting point observed in differential scanning calorimetry.

(a2) The proportion of the propylene-based polymer (a-1) in the propylene-based polymer (A) is 50 to 70.0% by mass.

(c1) The ethylenic polymer (C) includes copolymer (c-1) of ethylene and at least one α-olefin selected from α-olefins having 3 to 20 carbon atoms, and optionally an ethylene homopolymer (c-2).

(c2) The melt flow rate measured at 190° C. under a load of 2.16 kg in accordance with ASTM D1238 is 0.1 to 10 g/10 minutes.

(c3) The proportion of the copolymer (c-1) in the ethylenic polymer (C) is 40 to 100% by mass.

[2]

The adhesive resin composition according to [1], wherein the content of the ethylenic polymer (C) is 12.5 to 30 parts by mass.

[3]

The adhesive resin composition according to [1] or [2], wherein the melt flow rate (MFR) of the copolymer (c-1) as measured at 230° C. under a load of 2.16 kg in accordance with ASTM D1238 is less than 6.0 g/10 minutes.

[4]

The adhesive resin composition according to any one of [1] to [3], wherein the polyolefin (B) comprises 0.01 to 5% by mass of a structure derived from the unsaturated carboxylic acid and/or a derivative thereof in terms of a structure derived from maleic anhydride, and the polyolefin (b) includes 90 to 100 mol % of a structural unit derived from propylene.

[5]

The adhesive resin composition according to any one of [1] to [4], wherein the adhesive resin composition has the melt flow rate measured at 230° C. under a load of 2.16 kg in accordance with ASTM D1238 of less than 7.0 g/10 minutes.

[6]

A monolayer or multilayer film including at least one layer comprising the adhesive resin composition according to any one of [1] to [5].

[7]

A multilayer film including: at least one layer including the adhesive resin composition according to any one of [1] to [5]; and at least one further layer that is a layer other than the layer comprising the adhesive resin composition, wherein the layer including the adhesive resin composition is in contact with the further layer.

[8]

A multilayer film including: at least one layer including the adhesive resin composition according to any one of [1] to [5]; and at least one layer selected from a metal-containing layer, a polyolefin layer, and a polar resin layer, wherein the layer comprising the adhesive resin composition is in contact with the layer selected from a metal-containing layer, aa polyolefin layer, and the polar resin layer.

[9]

The monolayer film or multilayer film according to any one of [6] to [8], which is a film for battery packaging.

[10]

The monolayer film or multilayer film according to any one of [6] to [8], which is an electrode sealing material for lithium ion batteries.

[11]

A method for producing a monolayer or multilayer film, including a step of melt extruding the adhesive resin composition according to any one of [1] to [5].

Advantageous Effect of Invention

According to the adhesive resin composition of the present invention, it is possible to form a packaging film for batteries with an excellent resistance to electrolytic solution and an electrode sealing material for lithium ion batteries.

The monolayer or multilayer film according to the present invention exhibits an excellent resistance to electrolytic solution when used as a packaging film for batteries and an electrode sealing material for lithium ion batteries.

DESCRIPTION OF EMBODIMENTS

The present invention will be described in more detail below.

Adhesive Resin Composition

The adhesive resin composition according to the present invention contains a propylene-based polymer (A), a modified polyolefin (B), an ethylenic polymer (C).

<Propylene-Based Polymer (A)>

The propylene-based polymer (A) is a propylene-based polymer satisfying requirements (a1) and (a2) described below.

The requirement (a1) is that the propylene-based polymer (A) contains a propylene-based polymer (a-1) having a melting point (Tm) of 120° C. or higher observed in differential scanning calorimetry, and a propylene-based polymer (a-2) having a melting point (Tm) of lower than 120° C. observed or having no melting point observed in differential scanning calorimetry.

(Propylene-Based Polymer (a-1))

Examples of the propylene-based polymer (a-1) include a propylene homopolymer or a copolymer of propylene and at least one α-olefin having 2 to 20 carbon atoms other than propylene. Here, examples of the α-olefin having 2 to 20 carbon atoms excluding propylene include ethylene, 1-butene, 1-pentene, 1-hexene, 4-methyl-1-pentene, 1-octene, 1-decene, 1-dodecene, 1-tetradecene, 1-hexadecene, 1-octadecene, and 1-eicosene. Preferred is ethylene or α-olefins having 4 to 10 carbon atoms.

The copolymer of propylene and such an α-olefin may be random copolymers, or may be block copolymers. Structural units derived from the α-olefin can be included in the copolymer of the α-olefin and propylene at a proportion of 35 mol % or less, preferably 30 mol % or less, more preferably 10 mol % or less, and still more preferably 5 mol % or less. Further, the structural units derived from the α-olefin can be included in the copolymer of the α-olefin and propylene at 1 mol % or more and more preferably at 2 mol % or more.

The melting point (Tm) of the propylene-based polymer (a-1) observed in differential scanning calorimetry under the following conditions is 120° C. or higher.

The melting point (Tm) is preferably 120 to 170° C., more preferably 130 to 165° C.

(Measurement Conditions)

The melting point (Tm) is measured using a differential scanning calorimeter (DSC) (for example, DSC 8500 manufactured by PerkinElmer, Inc.). Approximately 5 mg of sample is sealed in an aluminum pan to be used as a sample. As a temperature profile, the temperature is raised from room temperature to a temperature of 230° C. at 10° C./min, held at 230° C. for 10 minutes, then falled to 30° C. at 10° C./min, held at 30° C. for 1 minute, and further raised to 230° C. at 10° C./min. The peak temperature at the second temperature rise (in the case of plural peak temperatures, the peak temperature at the highest temperature side is taken) is the melting point (Tm).

The propylene-based polymer (a-1) can have either an isotactic structure or syndiotactic structure.

In other words, examples of forms of the propylene-based polymer (a-1) include an isotactic propylene-based polymer (a-11) and a syndiotactic propylene-based polymer (a-12).

Examples of the isotactic propylene-based polymer (a-11) include a homopolypropylene excellent in heat resistance, for example, a known homopolypropylene usually having 3 mol % or less of a copolymer component other than propylene, a block polypropylene excellent in balance between heat resistance and flexibility, for example, a known block polypropylene usually having 3 to 30% by mass of a normal decane eluted-rubber component and a random polypropylene excellent in balance between flexibility and transparency, for example, a random polypropylene with a melting peak of 120° C. or higher, preferably in a range of 130° C. to 150° C., as measured by a differential scanning calorimeter (DSC), and can be appropriately selected from among them in order to obtain desired physical properties, or two or more kinds of the polypropylene components with different melting points and different stiffnesses can be combined for use.

Such an isotactic propylene-based polymer (a-11) is produced, for example, by polymerizing propylene or copolymerizing propylene and other α-olefin in a Ziegler catalyst system composed of, for example, solid catalyst components containing magnesium, titanium, halogen, and an electron donor as essential components, an organoaluminum compound, and an electron donor, or in a metallocene catalyst system using a metallocene compound as a catalyst component.

The syndiotactic propylene-based polymer (a-12) includes 90 mol % or more of a structural unit derived from propylene and 10 mol % or less of a structural unit derived from one or more selected from ethylene and α-olefins having 4 to 20 carbon atoms, and preferably includes 91 mol % or more of a structural unit derived from propylene and 9 mol % or less of a structural unit derived from one or more selected from ethylene and α-olefins having 4 to 20 carbon atoms (provided that the sum of the structural units of both is 100 mol %).

Examples of the α-olefin having 4 to 20 carbon atoms include 1-butene, 3-methyl-1-butene, 1-pentene, 1-hexene, 4-methyl-1-pentene, 1-octene, 1-decene, 1-dodecene, 1-tetradecene, 1-hexadecene, 1-octadecene, and 1-eicosene.

The syndiotactic propylene-based polymer (a-12) can be produced using, for example, the method described in WO2011/078054.

(Propylene-Based Polymer (a-2))

The propylene-based polymer (a-2) is a propylene-based polymer having a melting point (Tm) of lower than 120° C. observed in differential scanning calorimetry under the above conditions, or having no melting point observed in the differential scanning calorimetry.

The propylene-based polymer (a-2) has a structural unit derived from propylene and a structural unit derived from at least one olefin selected from α-olefins having 2 to 20 carbon atoms other than propylene, and the content of the structural unit derived from at least one olefin selected from α-olefins having 2 to 20 carbon atoms other than propylene, is usually 30 mol % or less, preferably 5 to 30 mol %, more preferably 7 to 26 mol %, and still more preferably 10 to 20 mol %. The content of structural unit derived from propylene is preferably 74 to 93 mol % and more preferably 80 to 90 mol %.

The isotactic triad fraction (mm fraction) of the propylene-based polymer (a-2) as measured by $^{13}$C-NMR is usually 80% or higher and preferably 85% or higher. The isotactic triad fraction (mm fraction) within the above range is preferred in view of maintaining mechanical properties.

Examples of the α-olefin having 2 to 20 carbon atoms other than propylene include ethylene, 3-methyl-1-butene, 1-butene, 1-pentene, 1-hexene, 4-methyl-1-pentene, 1-octene, 1-decene, 1-dodecene, 1-tetradecene, 1-hexadecene, 1-octadecene, and 1-eicosene, for example. As at least one olefin selected from α-olefins having 2 to 20 carbon atoms other than propylene, particularly preferred are ethylene, 1-butene, 1-hexene, 4-methyl-1-pentene and 1-octene.

(Other Requirements)

The intrinsic viscosity [η] of the propylene-based copolymer (a-2) measured in decalin at 135° C. is desirably 0.1 to 10 dL/g and preferably 0.5 to 10 dL/g. The degree of crystallinity of the propylene-based copolymer (a-2) measured by X-ray diffraction is preferably 20% or less and more preferably from 0 to 15%.

This propylene-based copolymer (a-2) has a single glass transition temperature, and the glass transition temperature (Tg) obtained by differential scanning calorimetry (DSC) is usually in a range of from −50° C. to 10° C., preferably in the range of −40° C. to 0° C., and more preferably in the range of −35° C. to 0° C.

The molecular weight distribution (Mw/Mn in terms of polystyrene, Mw: weight-average molecular weight, Mn: number-average molecular weight) of the propylene-based copolymer (a-2) as measured by GPC is preferably 3.5 or less, more preferably 3.0 or less, and more preferably 2.5 or less. The lower limit value is 1.5 or more, for example.

The requirement (a2) is that a proportion of the propylene-based polymer (a-1) in the propylene-based polymer (A) is 50 to 70.0% by mass. With the proportion of polymer (a-1) within the above range, a composition excellent in resistance to whitening can be obtained.

The propylene-based polymer (A) desirably has a melt flow rate (MFR) as measured at 230° C. and under a load of 2.16 kg in accordance with ASTM D1238 in a range of 0.01 to 1000 g/10 minutes and preferably in the range of 0.05 to 100 g/10 minutes.

<Modified Polyolefin (B)>

The modified polyolefin (B) is a polyolefin obtained by modifying a polyolefin (b) with an unsaturated carboxylic acid and/or a derivative thereof.

Examples of the polyolefin (b) can preferably include a polypropylene (b1).

The polypropylene (b1) is, for example, a homopolymer of propylene and/or a propylene •α-olefin copolymer. Examples of the α-olefin include, but are not limited to, preferably ethylene and α-olefins having 4 to 20 carbon atoms. These α-olefins may be used singly or in combinations of two or more thereof. Preferred α-olefins are ethylene and α-olefins having 4 to 10 carbon atoms. Among these, particularly suitable are ethylene and α-olefins having 4 to 8 carbon atoms. Here, the content of the structural unit derived from propylene in the propylene •α-olefin copolymer is at least 50 mol % or more and less than 100%.

The intrinsic viscosity [η] of the polypropylene (b1) is preferably 0.1 to 10 dl/g. An intrinsic viscosity [η] in this range can attain a composition having high formability and mechanical strength.

A method for producing the polypropylene (b1) is not particularly limited and examples thereof include a well-known method using well-known catalysts such as a Ziegler-Natta catalyst and a metallocene catalyst.

The polypropylene (b1) is preferably a crystalline polymer, and in the case of a copolymer, the polypropylene (b1) may be a random copolymer or a block copolymer. The polypropylene (b1) may be a commercially available product.

The polypropylene (b1) is, for example, a homopolypropylene or a propylene •α-olefin random copolymer. The polypropylene (c1) may also contain several different isotactic polypropylenes.

Examples of the unsaturated carboxylic acid and/or a derivative thereof include an unsaturated compound having one or more carboxy groups in one molecule, an ester of a compound having a carboxy group and an alkyl alcohol, an unsaturated compound having in one molecule, one or more structures represented by R—CO—O—CO—R' (each of R and R' is independently a hydrocarbon group.), for example. Examples of the unsaturated group that the unsaturated compound has, include a vinyl group, a vinylene group, and an unsaturated cyclic hydrocarbon group. The unsaturated carboxylic acid and/or a derivative thereof may be used singly or in combinations of two or more kinds. Among them, an unsaturated dicarboxylic acid and an acid anhydride thereof are preferred, and maleic acid, nadic acid and acid anhydrides thereof are particularly preferred.

The number of structures derived from an unsaturated carboxylic acid and/or a derivative thereof in the modified polymer (B), is preferably 0.01 to 5% by mass and more preferably 0.05 to 3.5% by mass, in terms of the amount of structure derived from maleic anhydride (i.e., assuming that the unsaturated carboxylic acid and/or a derivative thereof is maleic anhydride). With the number of structures derived from the unsaturated carboxylic acid and/or a derivative thereof within the above range, a resin composition excellent in balance between formability and adhesive strength can be obtained.

In the modified polyolefin (B), the polyolefin (b) preferably contains 50 to 100 mol % of a structural unit derived from propylene. The content proportion of the structural unit derived from propylene in this range can provide a resin composition having an excellent heat resistance.

A method of modifying the polyolefin (b) with an unsaturated carboxylic acid and/or a derivative thereof is not particularly limited, and can employ a conventionally known graft polymerization method such as a solution method or a melt kneading method. For example, a method of melting the polyolefin (b) and adding thereto an unsaturated carboxylic acid and/or a derivative thereof to undergo graft reaction, or a method of dissolving the polyolefin (b) in a solvent to prepare solution and adding thereto an unsaturated carboxylic acid and/or a derivative thereof to undergo graft reaction, for example, can be employed.

<Ethylenic Polymer (C)>

The ethylenic polymer (C) is an ethylenic polymer that satisfies the following requirements (c1) to (c3).

The requirement (c1) is that the ethylenic polymer (C) contains a copolymer (c-1) of ethylene and at least one α-olefin selected from α-olefins having 3 to 20 carbon atoms, and optionally an ethylene homopolymer (c-2).

Examples of the α-olefins include propylene, 1-butene, 1-pentene, 1-hexene, 4-methyl-1-pentene, 1-octene, 1-decene, 1-dodecene, 1-tetradecene, 1-hexadecene, 1-octadecene, and 1-eicosene, and preferred are the propylene, 1-butene, 1-hexene, and 1-pentene among them.

The α-olefin may be one kind or two or more kinds.

The copolymer (c-1) preferably contains 30 to 99 mol % and more preferably 50 to 99 mol %, of a structural unit derived from ethylene, and 1 to 70 mol % and more preferably 1 to 50 mol %, of a structural unit derived from an α-olefin selected from α-olefins having 3 to 20 carbon atoms (provided that the sum of structural units of ethylene and the α-olefin is 100 mol %).

The melt flow rate (MFR) of the copolymer (c-1) as measured at 230° C. under a load of 2.16 kg in accordance with ASTM D1238 is preferably less than 6.0 g/10 minutes, more preferably 0.5 to 5.5 g/10 minutes, and still more preferably 0.5 to 2.0 g/10 minutes.

The melt flow rate (MFR) of the copolymer (c-1) as measured at 190° C. under a load of 2.16 kg in accordance with ASTM D1238 is preferably less than 4.5 g/10 minutes, more preferably 0.3 to 4.1 g/10 minutes, and still more preferably 0.3 to 1.5 g/10 minutes.

The requirement (c2) is that the melt flow rate (MFR) of the ethylenic polymer (C) as measured at 190° C. under a load of 2.16 kg in accordance with ASTM D1238 is 0.1 to 10 g/10 minutes.

The MFR is preferably 0.3 to 8 g/10 minutes and more preferably 0.5 to 6 g/10 minutes. Within the above range of the MFR, the composition of the present invention is excellent in balance between flexibility and mechanical strength, and has a high adhesive strength.

The MFR exceeding 10 g/10 minutes, on the other hand, results in large wall thinning of the composition upon heat sealing and allows the adhesive layer formed from the composition to be thinner, thereby reducing its adhesive strength, and the MFR below 0.1 g/10 minutes lowers wettability to an adherend, thereby reducing the adhesive strength.

The density of the ethylenic polymer (C) is preferably 0.855 to 0.970 g/cm³, more preferably 0.860 to 0.940 g/cm³, and still more preferably 0.865 to 0.930 g/cm³, from the viewpoint of flexibility.

The requirement (c3) is that a proportion of the copolymer (c-1) in the ethylenic polymer (C) is 40 to 100% by mass. The proportion is preferably 45 to 100% by mass and more preferably 50 to 100% by mass in terms of the resistance to electrolytic solution.

Methods for producing the copolymer (c-1) and the homopolymer (c-2) are not particularly limited, and they can be produced by a high-pressure method or well-known methods using well-known catalysts, such as a Ziegler-Natta catalyst and a metallocene catalyst. The copolymer (c-1) and the homopolymer (c-2) may be commercially available products.

The ethylenic polymer (C) may be a polymer grafted with a small amount of maleic anhydride and the like as long as the above conditions are satisfied. The ethylenic polymer (C) may be an ethylenic polymer prepared by grafting a small amount of maleic anhydride or the like, and then, further modifying the graft monomer with diamine, carbodiimide or the like, as long as the conditions above are satisfied.

<Optional Component>

The adhesive resin composition of the present invention may contain an additive to the extent that effects of the present invention are not impaired. Examples of the additive include an antioxidant, an ultraviolet ray absorber, a neutralizer, a nucleating agent, a light stabilizer, an antistatic agent, an antiblocking agent, a lubricant, an odor adsorbent, an antibacterial agent, a moisture absorbent, a pigment, an inorganic or organic filler, and polymers other than the propylene-based polymer (A), the modified polyolefin (B), and the ethylenic polymer (C).

(Adhesive Resin Composition)

The content of propylene-based polymer (A), modified polyolefin (B), and ethylenic polymer (C) in the adhesive resin composition of the present invention is 50 to 89.9 parts by mass, 0.1 to 20 parts by mass, and 10 to 30 parts by mass, respectively, preferably 50 to 87.5 parts by mass, 0.5 to 20 parts by mass, and 12 to 30 parts by mass, respectively, and more preferably 50 to 84 parts by mass, 1 to 20 parts by mass, and 15 to 30 parts by mass, respectively, as the total content of the three components being 100 parts by mass.

With the content of the components described above within the above ranges, the resin composition of the present invention has high adhesive strength, in particular high adhesive strength after immersion in an electrolytic solution, and a film containing the layer obtained from the composition of the present invention is unlikely to result in reduced adhesive strength due to the immersion in an electrolytic solution.

The content of propylene-based polymer (A) of less than 50 parts by mass cannot provide a desired initial adhesive strength.

A preferred aspect is also that the content of the ethylenic polymer (C) is 12.5 to 30 parts by mass or 13 to 30 parts by mass. With the content of ethylenic polymer (C) within the above range, the adhesive resin composition is less likely to result in reduced adhesive strength due to immersion in an electrolytic solution, and is excellent in stability upon film forming.

The MFR (in accordance with ASTM D1238, 190° C., and 2.16 kg load) of the adhesive resin composition of the present invention is preferably less than 7.0 g/10 minutes, more preferably 3.0 g/10 minutes or more and less than 7.0 g/10 minutes. Within the above range of the MFR, the adhesive resin composition of the present invention is excellent in balance between formability (resistance to wall thinning) and adhesive strength.

The number of structures derived from the unsaturated carboxylic acid and/or a derivative thereof in the adhesive resin composition of the present invention, is preferably 0.03 to 0.30% by mass and more preferably 0.06 to 0.20% by mass, in terms of the number of structure derived from maleic anhydride (i.e., assuming that the unsaturated carboxylic acid and/or a derivative thereof is maleic anhydride).

The adhesive resin composition of the present invention can be produced by conventionally known methods, except that the propylene-based polymer (A), the modified polyolefin (B), and the ethylenic polymer (C), described above are used as raw materials. For example, the components described above can be melt kneaded to produce the resin composition.

<Sea-Island Structure>

The adhesive resin composition of the present invention forms a finely dispersed structure (so-called a sea-island structure), containing the propylene-based polymer (A) in a continuous phase, and the ethylenic copolymer (C) that is dispersed in the continuous phase, in a dispersed phase. Such a structure formed improves the resistance to electrolytic solution in a layer composed of the adhesive resin composition. The reason for this is not necessarily clarified, but is presumed because trapping an electrolytic solution in the dispersed phase can inhibit the electrolytic solution from penetrating an interface between a layer composed of the adhesive resin composition and a metal (hereinafter also referred to as "adhesive interface").

The average particle size of the dispersed phase, as measured by the following method, is preferably 0.001 to 10 μm. The upper limit value of the average particle size of the dispersed phase is more preferably 8 μm, still more preferably 6 μm, and particularly preferably 5 μm, and the lower limit value is preferably 0.09 μm.

(Measurement Method of Average Particle Size)

A teste piece is ground with a microtome, for example, and any cross-section obtained with an area of approximately 45 μm×75 μm or larger is analyzed by using a transmission electron microscope (for example, an H-7650 manufactured by Hitachi High-Technologies Corporation) under 3,000 times magnification. The analysis is carried out by binarization processing using image analysis software (for example, ImageJ).

From TEM photographs, occupied regions of a continuous phase and a dispersed phase are identified, respectively.

In the case of a shape of the dispersed phase being a circle, the diameter is used as a particle size, and in the case of a shape of the dispersed phase being an ellipse, the length of the major axis is used as a particle size. Moreover, in the case of a shape of the dispersed phase other than a circle or an ellipse, the area of the dispersed phase is determined followed by determination of the diameter of a perfect circle with an area equal to the area of the dispersed phase, which is used as a particle size.

The average particle size of the dispersed phase of 0.001 μm or larger provides a sufficient cavitation effect and renders excellent resistance to electrolytic solution.

The dispersed phase having an average particle size of 10 μm or smaller does not interfere with adhesive strength of the continuous phase when the dispersed phase is present at an adhesive interface, whereby the composition of the present invention exhibits favorable adhesive strength.

In a region with an area of 10 μm×10 μm, randomly selected, of a cross section of a sample piece upon measuring an average particle size of a dispersed phase of the adhesive resin composition of the present invention, a proportion of the number of dispersed phases with a particle size of 0.001 to 5 μm in 80% or more of the total number of dispersed phases is preferably 80% or more, more preferably 85% or more, still more preferably 90% or more, particularly preferably 95% or more, and most preferably 100%. When the proportion is 85% or more, the composition has excellent adhesive strength.

Monolayer or Multilayer Film

The monolayer or multilayer film of the present invention is characterized in that it includes at least one layer containing the adhesive resin composition of the present invention as described above.

Examples of a specific aspect of the monolayer or multilayer film of the present invention include a multilayer film including at least one layer containing the adhesive resin composition of the present invention and at least one further layer that is a layer other than the layer containing the adhesive resin composition, wherein the layer containing the adhesive resin composition is in contact with the further layer, and a multilayer film including at least one layer containing the adhesive resin composition of the present invention and at least one layer selected from a metal-containing layer, a polyolefin layer, or a polar resin layer, wherein the layer containing the adhesive resin composition is in contact with the layer selected from at least one layer of the metal-containing layer, the polyolefin layer, or the polar resin layer.

Examples of the further layer include a metal-containing layer, a polyolefin layer and a polar resin layer.

Examples of the metal-containing layer include an aluminum layer (for example, an aluminum foil), a copper layer, and a stainless steel layer.

Examples of the polyolefin layer include a polypropylene layer, a poly4-methylpentene layer, and a polyethylene layer.

Examples of the polar resin layer include a polyamide layer, an EVOH layer, a PET layer, and a PBT layer.

The layer containing the adhesive resin composition of the present invention can be produced by shaping the adhesive resin composition of the present invention, for example, melt extruding the same. Therefore, the monolayer or multilayer film of the present invention can be produced by a casting method, an inflation method, and an extrusion lamination method, for example.

The monolayer or multilayer film of the present invention can be used as a packaging film for batteries, preferably a packaging film for lithium ion batteries, or as an electrode sealing material for lithium ion batteries.

EXAMPLES

The present invention will be described based on Examples below, however, the present invention is not in no way limited to these Examples.

Measurement Method of Physical Properties

<Melt Flow Rate (MFR)>

MFR of the propylene-based polymer and the composition were measured according to ASTM D1238 at a temperature of 230° C. and a load of 2.16 kg.

The MFR of the ethylenic copolymer was measured according to ASTM D1238 at a temperature of 190° C. and a load of 2.16 kg or at a temperature of 230° C. and a load of 2.16 kg. In a case in which the ethylenic polymer includes two or more kinds of copolymer (c-1) and ethylene homopolymer (c-2), "MFR of ethylenic polymer" refers to a value calculated using MFR of each ethylenic polymer under the logarithmic summation law.

<Density>

The density was measured in accordance with JIS K7112 (density gradient tube method).

<Content Proportion of Structural Unit>

A content proportion of a structural unit derived from ethylene or propylene in the polymer was quantified by $^{13}$C-NMR using the following apparatus and conditions.

With a JEOL JECX400P nuclear magnetic resonance spectrometer, the conditions of using a mixed solvent of heavy ortho-dichlorobenzene/heavy benzene (80/20% by volume) as a solvent, sample concentration of 60 mg/0.6 mL, measurement temperature of 120° C., observation nucleus of $^{13}$C (100 MHZ), sequence of single-pulse proton decoupling, pulse width of 4.62 μsec (45° pulse), repetition time of 5.5 sec, number of accumulations of 8000 times, and 29.73 ppm as the reference value of chemical shift, were employed.

<Graft Modification Amount>

The number of structure derived from maleic anhydride (graft modification amount) was quantified by measuring intensity of the peak at 1790 cm$^{-1}$ derived from the structure using an infrared absorption spectrometer and using a calibration curve preliminarily prepared.

Raw Materials

The polyolefins used in Examples and Comparative Examples are listed below. All of these polyolefins were prepared by polymerization and optional graft modification with maleic anhydride according to the ordinary method.

Propylene Polymer (A)

PP-1: Random polypropylene (propylene content 96 mol %, ethylene content 4 mol %, MFR=7.0 g/10 minutes, density=0.91 g/cm$^3$, melting point=138° C., isotactic structure)

PP-2: Random polypropylene (propylene content 96 mol %, ethylene content 4 mol %, MFR=29.0 g/10 minutes, density=0.90 g/cm$^3$, melting point=138° C., isotactic structure)

PER-1: Propylene ethylene copolymer (propylene content 87 mol %, ethylene content 13 mol %, MFR=8.0 g/10 minutes, density=0.88 g/cm$^3$, melting point=79° C.)

Polyolefin (B)

Modified PP-1: Modified homopolypropylene (the number of structure derived from maleic anhydride (amount of graft modification) 3.0% by mass)

Ethylenic Polymer (C)

EPR-1: Ethylene propylene copolymer (ethylene content 80 mol %, propylene content 20 mol %, MFR of 0.6 g/10 minutes, at a temperature of 190° C. under a load of 2.16 kg, MFR of 0.8 g/10 minutes, at a temperature of 230° C. and under a load of 2.16 kg, and density=0.87 g/cm$^3$)

PE-1: Low density polyethylene (MFR of 7.0 g/10 minutes, at a temperature of 190° C. under a load of 2.16 kg, and MFR of 17.8 g/10 minutes, at a temperature of 230° C. under a load of 2.16 kg, and density=0.91 g/cm$^3$)

Example 1

<Production of Composition 1>

A composition 1 was obtained by melt kneading 48 parts by mass of PP-1, 25 parts by mass of PER-1, 5 parts by mass of modified PP-1, 15 parts by mass of EPR-1, and 7 parts by mass of PE-1 at 230° C. by using a single screw extruder.

<Production of Composite>

A film of 100 μm thickness was formed from the composition 1 obtained in Example 1 by using an extrusion forming machine with a T-die. The obtained film was overlaid with an aluminum foil having a thickness of 200 μm, and heat-sealed by using a heat sealer under the conditions of 160° C. and 0.1 MPa for 5 seconds. The obtained composite was cut in 15 mm width to prepare a sample for measurement.

<Composite Immersed in Electrolytic Solution>

One of the samples for measurement was immersed in an electrolytic solution in which to a solvent of ethyl carbonate: diethyl carbonate=3:7, containing 1 mol/L LiPF$_6$, was added 1,000 ppm water, and the electrolytic solution was allowed to stand at 85° C. for 1 week.

<Measurement of Adhesive Strength of Composite>

For the other sample for measurement (composite immediately after the production) and a sample for measurement after immersion in the electrolytic solution (composite after immersion in the electrolytic solution), each adhesive strength (unit: N/15 mm) between the aluminum foil and the film composed of the composition 1 was measured using a T-peel method at room temperature at 23° C. by using a tensile tester machine. A crosshead speed was set to 300 mm/min. According to a proportion of the adhesive strength of the composite after immersion in the electrolytic solution (hereinafter referred to as "adhesive strength after immersion in the electrolytic solution") to the adhesive strength of the composite immediately after production (hereinafter referred to as "initial adhesive strength"), ratings of the composites were determined and listed in Table 1. The evaluation criteria are as follows.

(Initial Adhesive Strength)

CC: Less than 8 N/15 mm

BB: 8 N/15 mm or higher and less than 10 N/15 mm

AA: 10 N/15 mm or higher (Resistance to Electrolytic Solution)

CC: Adhesive strength after immersion in the electrolytic solution/Initial adhesive strength, of less than 10%

BB: Adhesive strength after immersion in the electrolytic solution/Initial adhesive strength, of 10% or higher and less than 15%

AA: Adhesive strength after immersion in the electrolytic solution/Initial adhesive strength, of 15% or higher.

It is to be noted that "-" denotes that the electrolytic solution was not evaluated.

<Evaluation of Wall Thinning in Composition>

A film of 100 μm thickness was formed from the composition 1 obtained in Example 1 by using an extrusion forming machine with a T-die. The two films obtained were stacked on one another and heat-sealed by using a heat sealer under the conditions of 170° C. and 0.2 MPa for 3 seconds. A cross section of the heat-sealed portion was observed with a microscope, and a thickness of the thinnest portion was measured and taken as a thickness after heat sealing. A residual rate after heat sealing was calculated from (thickness after heat sealing)/(thickness for two initial films), and ratings of each composite were determined according to the residual rates and listed in Table 1. The evaluation criteria are as follows.

(Resistance to Wall Thinning)

CC: The thickness after heat sealing/the initial thickness, of less than 30%

BB: The thickness after heat sealing/the initial thickness, of 30% or higher and less than 60%

AA: The thickness after heat sealing/the initial thickness, of 60% or higher

<Evaluation of Resistance to Whitening of Composition>

The PP-2 and the composition 1 were coextruded at 290° C. by using a screw with a diameter of 50 mm and an effective length L/D=28. The extruded PP-2 and the composition 1 were stacked in a feed block so that the PP-2 was an outer layer and the composition 1 was an inner layer, and a laminate with a thickness of approximately 40 μm, having the outer layer and the inner layer with each thickness of 20 μm, was fabricated in film form. The die temperature was 290° C. This laminate in a molten state was brought into contact with a surface of an aluminum foil (thickness: 20 μm), and then taken up at a speed of 50 m/min while being cooled with a chill roll equipped with a pinch roll. The obtained multilayer film was deep-drawn by using a mold with a meshing depth of 5 mm. The degree of whitening generated on wall surfaces of the resulting formed articles was visually evaluated according to the following criteria:

AA: No whitening

BB: Slightly whitened

CC: Significantly whitened

Examples 2 and 3 and Comparative Examples 1 to 6

Each composition was prepared in the same manner as in Example 1, except that each composition was prepared according to the formulations shown in Table 1, and composites and the like were produced and evaluated by using the obtained compositions. The results are shown in Table 1.

TABLE 1

| | | | Example 1 | Example 2 | Example 3 | Comparative Example 1 |
|---|---|---|---|---|---|---|
| Compounding ratio | PP-1 | Parts by mass | 48 | 51 | 38 | 88 |
| | PP-2 | Parts by mass | | | | |
| | PER-1 | Parts by mass | 25 | 22 | 27 | |
| | Modified PP-1 | Parts by mass | 5 | 5 | 5 | 5 |
| | EPR-1 | Parts by mass | 15 | 15 | 20 | 7 |
| | PE-1 | Parts by mass | 7 | 7 | 10 | |
| MFR of ethylenic polymer (190° C., 2.16 kgf) | | g/10 minutes | 1.3 | 1.3 | 1.4 | 0.6 |
| MFR of composition (230° C., 2.16 kgf) | | g/10 minutes | 6.7 | 6.6 | 6.4 | 6.8 |
| Initial adhesive strength | | | — | AA | AA | AA |
| Resistance to electrolytic solution | | | — | AA | AA | CC |
| Resistance to wall thinning | | | — | AA | AA | AA |
| Resistance to whitening | | | — | AA | AA | BB |

| | | | Comparative Example 2 | Comparative Example 3 | Comparative Example 4 | Comparative Example 5 | Comparative Example 6 |
|---|---|---|---|---|---|---|---|
| Compounding ratio | PP-1 | Parts by mass | 48 | 25 | 73 | 70 | 25 |
| | PP-2 | Parts by mass | | | | | 48 |
| | PER-1 | Parts by mass | 25 | | | | |
| | Modified PP-1 | Parts by mass | 5 | 5 | 5 | 5 | 5 |
| | EPR-1 | Parts by mass | 7 | 35 | 15 | 25 | 15 |
| | PE-1 | Parts by mass | 15 | 35 | 7 | | 7 |
| MFR of ethylenic polymer (190° C., 2.16 kgf) | | g/10 minutes | 3.2 | 2.0 | 1.3 | 0.6 | 1.3 |
| MFR of composition (230° C., 2.16 kgf) | | g/10 minutes | 7.8 | 5.4 | 6.6 | 5.2 | 13.5 |
| Initial adhesive strength | | | — | AA | CC | AA | AA |
| Resistance to electrolytic solution | | | — | CC | — | AA | AA |
| Resistance to wall thinning | | | — | BB | AA | AA | BB |
| Resistance to whitening | | | — | AA | CC | CC | CC |

The invention claimed is:

1. An adhesive resin composition, comprising
50 to 89.9 parts by mass of a propylene-based polymer (A) satisfying the following (a1) and (a2),
0.1 to 20 parts by mass of a modified polyolefin (B) obtained by modifying a polyolefin (b) with an unsaturated carboxylic acid and/or a derivative thereof, and
10 to 30 parts by mass of an ethylenic polymer (C) satisfying the following (c1) to (c3), provided that the sum of (A), (B) and (C) is 100 parts by mass:
(a1) the propylene polymer (A) comprises a propylene-based polymer (a-1) having a first melting point (Tm) of 120° C. or higher observed in differential scanning calorimetry, and a propylene-based polymer (a-2) having a second melting point (Tm) of lower than 120° C. observed or having no melting point observed in differential scanning calorimetry,
(a2) a proportion of the propylene-based polymer (a-1) in the propylene-based polymer (A) is 50 to 70.0% by mass,
(c1) the ethylenic polymer (C) comprises a copolymer (c-1) of ethylene and at least one α-olefin selected from α-olefins having 3 to 20 carbon atoms, and optionally an ethylene homopolymer (c-2),
(c2) a melt flow rate measured at 190° C. under a load of 2.16 kg in accordance with ASTM D1238 is 0.1 to 10 g/10 minutes, and
(c3) a proportion of the copolymer (c-1) in the ethylenic polymer (C) is 40 to 100% by mass,
wherein the adhesive resin composition has a melt flow rate measured at 230° C. under a load of 2.16 kg in accordance with ASTM D1238 of less than 7.0 g/10 minutes.

2. The adhesive resin composition according to claim 1, wherein the content of the ethylenic polymer (C) is 12.5 to 30 parts by mass.

3. The adhesive resin composition according to claim 1, wherein the melt flow rate (MFR) of the copolymer (c-1) as measured at 230° C. under a load of 2.16 kg load in accordance with ASTM D1238 is less than 6.0 g/10 minutes.

4. The adhesive resin composition according to claim 1, wherein the polyolefin (B) comprises 0.01 to 5% by mass of a structure derived from the unsaturated carboxylic acid and/or a derivative thereof in terms of a structure derived from maleic anhydride, and

the polyolefin (b) comprises 90 to 100 mol % of a
structural unit derived from propylene.

5. A monolayer or multilayer film comprising at least one
layer comprising the adhesive resin composition according
to claim 1.

6. A multilayer film comprising: at least one layer com-
prising the adhesive resin composition according to claim 1;
and at least one further layer that is a layer other than the
layer comprising the adhesive resin composition, wherein
the layer comprising the adhesive resin composition is in
contact with the further layer.

7. A multilayer film comprising: at least one layer com-
prising the adhesive resin composition according to claim 1;
and at least one layer selected from a metal-containing layer,
a polyolefin layer, and a polar resin layer, wherein the layer
comprising the adhesive resin composition is in contact with
the layer selected from a metal-containing layer, a polyolefin
layer, and a polar resin layer.

8. The monolayer or multilayer film according to claim 5,
which is a film for battery packaging.

9. The monolayer or multilayer film according to claim 5,
which is an electrode sealing material for lithium ion bat-
teries.

10. A method for producing a monolayer or multilayer
film, comprising a step of melt extruding the adhesive resin
composition according to claim 1.

\* \* \* \* \*